United States Patent [19]

Johansson

[11] 3,977,212

[45] Aug. 31, 1976

[54] FLEXIBLE COUPLING

[75] Inventor: Carl-Eric Johansson, Blaricum, Netherlands

[73] Assignee: SKF Industrial Trading and Development Company, B.V., Jutphaas, Netherlands

[22] Filed: May 18, 1974

[21] Appl. No.: 469,694

[30] Foreign Application Priority Data
May 14, 1973  Netherlands.................... 7306658

[52] U.S. Cl. ............................... 64/14; 64/11 R; 64/27 NM
[51] Int. Cl.² ......................................... F16D 3/64
[58] Field of Search ................ 64/14, 11 R, 27 NM, 64/9 A, 6, 27 R

[56] References Cited
UNITED STATES PATENTS

| 2,764,003 | 9/1956 | Croset | 64/14 |
| 2,989,857 | 6/1961 | Helland et al. | 64/11 R |
| 3,729,953 | 5/1973 | Wanzer | 64/14 |

FOREIGN PATENTS OR APPLICATIONS

| 229,487 | 12/1958 | Australia | 64/14 |
| 111,807 | 12/1917 | United Kingdom | 64/14 |
| 669,724 | 4/1952 | United Kingdom | 64/14 |

Primary Examiner—Samuel Scott
Assistant Examiner—Randall Heald
Attorney, Agent, or Firm—Daniel M. Rosen

[57] ABSTRACT

Flexible coupling which can rotate in both directions, comprising two coupling parts connected to each other by torque transmitting simultaneously loaded resilient rolling elements which are mounted in pockets, each of which is defined by two adjacent cavities in said two coupling parts.

8 Claims, 3 Drawing Figures

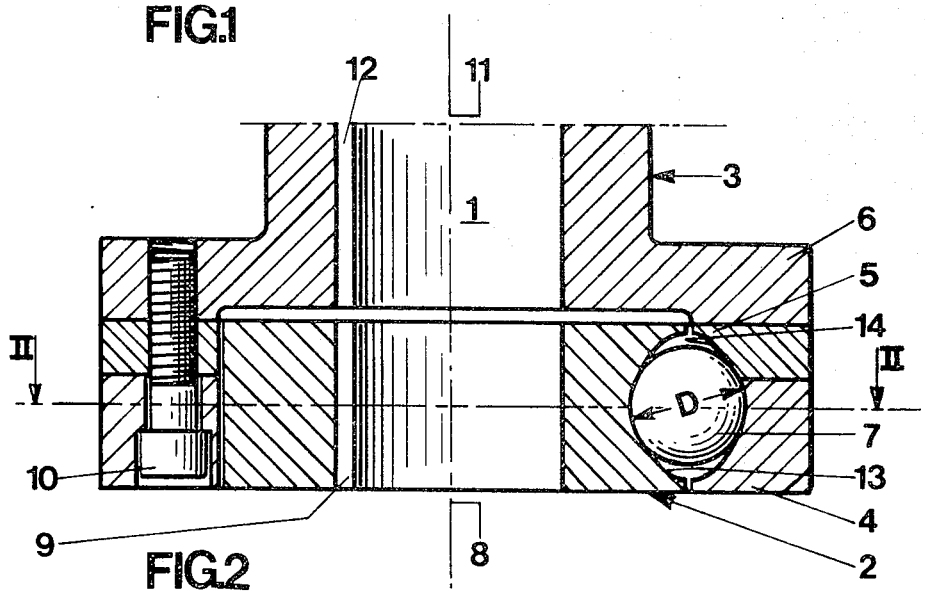
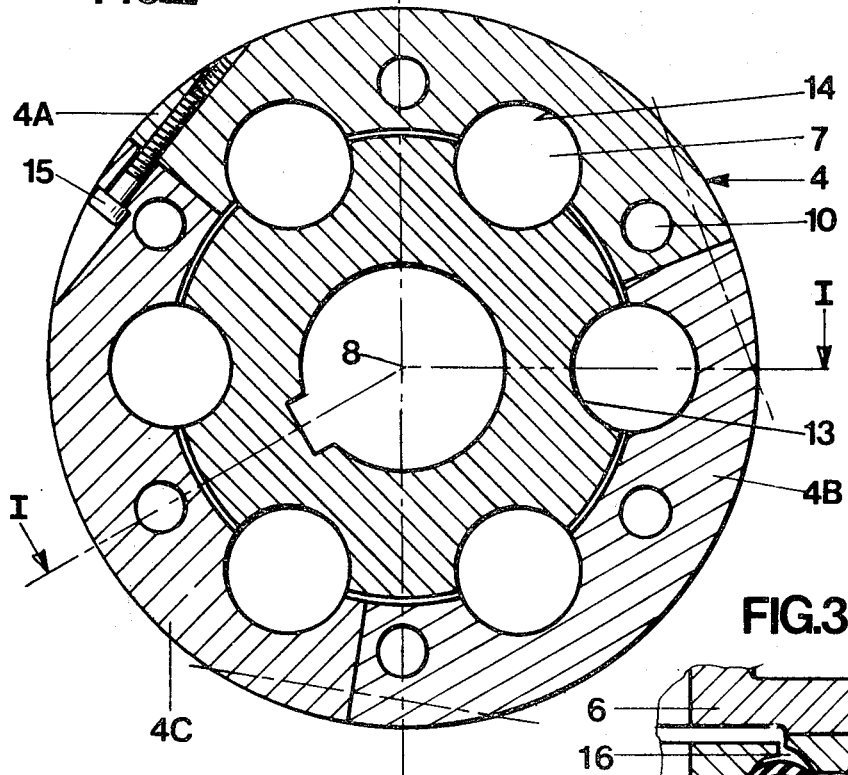
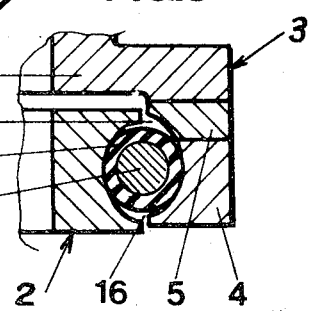

FLEXIBLE COUPLING

BACKGROUND OF THE INVENTION

This invention relates to a flexible coupling which can rotate in both directions and mainly comprising two coupling halves one part of a half projecting into the other, said halves being connected to each other by torque transmitting simultaneously loaded resilient elements which are mounted in cavities provided in said coupling sleeves. A similar but different coupling is disclosed for example in the British patent specification 111.807.

An object of the invention is to improve a coupling of the said type by introducing a simple and effective means for realizing a precompression in said resilient elements which increases the working capacity and applicability of said coupling. The improvement also provides a flexible coupling having resilient elements of different densities and characteristics through which the capability of said coupling will be enlarged. Another advantage is obtained by the fact that replacement of the coupling parts can be achieved by handling simple tools and without displacing the units which are connected to each other by the improved coupling.

SUMMARY OF THE INVENTION

According to the invention the cavities within the halves of the coupling, in accordance with the longitudinal sectional view, have a spherical or an oval form and fully encapsulate the torque transmitting elements, whereby one half of the coupling forming a part of said cavities, comprises at least two different proportioned parts by means of which a precompression in said elements can be achieved.

Advantages of the coupling according to the invention are characterized in that, at least one of the coupling halves, which can have the form of a ring or dividable block parts, covers a larger surface of a resilient element; good accessibility to the resilient elements is obtained; by using bolt connections, for example, between said coupling parts, an effective adjustment of the precompression in the resilient elements is possible, whereby said resilient elements will conform to the shape of the cavities. In use the coupling will not create axial force but instead can absorb reasonable axial load in both axial directions, and within certain limits is axially self-adjusting. The new coupling permits a greater misalignment of the shafts of the units being coupled, as compared with other known coupling designs, without unduly impairing the working conditions. The coupling is self-centering, and it allows a reasonable parallel mis-alignment.

The invention will be explained further by reference to the drawing, whereby advantages and other featured of the invention will become evident.

BRIEF DESCRIPTION OF THE DRAWING

FIG. 1 is a longitudinal sectional view of a coupling according to the invention.

FIG. 2 is a cross-sectional view of the coupling taken along according to line II—II of FIG. 1.

FIG. 3 is a fragmentary sectional view of the coupling of FIG. 1 provided with specific torque transmitting elements.

DETAILED DESCRIPTION OF THE PREFERRED EMBODIMENT

According to FIG. 1, coupling 1 comprises coupling halves 2 and 3, of which coupling half 3 comprises of parts 4, 5 and a flange part 6. Coupling part 4 which is larger than part 5 contacts the resilient round, spherical or the like element 7 over a larger area than coupling part 5, with the resulting advantage that by removing only part 4, the interior of the coupling is easily accessible, i.e. the elements 7 can be exchanged in a simple and quick manner without disturbing the position of the other parts or the coupled units. Depending on the application of the coupling concerned, coupling parts 2, 4, 5 and 6 can be made of different materials.

Coupling 2 is furthermore connected to a shaft 8 (indicated by centre-line) by means of e.g. a key connection 9. The separable coupling parts 4 and 5 are secured to part 6 by bolt-connections 10; flange part 6 is connected to a shaft 11 also by a key connection 12. By means of the bolt connections 10 a precompression in the resilient elements 7 is imposed. In relation to this, the halves 2 and 3 are provided with spherical or oval-like cavities 13 and 14 respectively which have the same dimensions. The distance D of the cooperating cavities 13 and 14 however is smaller than the diameter of the ball-like element 7, while the distance in axial direction of said cavities is larger than the said ball diameter. Due to this arrangement, after tightening the bolt connection 10 during mounting, the resilient elements will adopt the form of said cooperating cavities 13 and 14, whereby the above mentioned advantages will be obtained. Further, the compression of the resilient ball-elements 7 give the coupling suitable damping properties against torsional vibrations.

According to the view in FIG. 2, however, the resilient elements 7 are fully enclosed in radial direction by the cavities 13 and 14 of the coupling halves 2 and 3, so that an effective transmission of torque or power in both directions is still guaranteed. In these preferred embodiments coupling half 4 comprises segments 4A, 4B and 4C which fit into each other and are connected to each other by means of bolt-connections 15 arranged within the periphery of the coupling 1. This arrangement makes it possible to remove the coupling sleeve 4 from the coupling in a simple and easy way, preventing for example axial displacement of the unit or machine to which the coupling is connected. It is possible to compose both sleeveparts 4 and 5 of such separable segments, connected to each other by bolts 15. The application of a relatively large number of adjusting bolts 10 furthermore permits an easy precompression of the resilient elements 7.

FIG. 3 shows a part of the longitudinal sectional view of a coupling according to the invention, in which coupling half 2 is axially displaced in relation to coupling half 3. With this invention such a displacement of shafts 8 and 11 now can be tolerated within certain limits, without resulting in unduly axial loads in the connected or coupled units or machine-parts. This is chiefly due to specific cavities being present between the coupling halves 2 and 3 and elements 7, which elements become slightly oval owing to the precompression, wherein space 16 in the cavities 13 and 14 permits such a relative flexible coupling system. In this preferred embodiment, elements with a resilient outer layer 17 are provided with a reinforced (i.e. less resilient) core 18, which prevents the situation where the elements 17 would suddenly cease to function e.g. during overrunning, such as due to the fracture of the resilient material for example by overheating.

It is pointed out that assembly, disassembly and subsequent adjustment of the coupling can be carried out by one person handling simple adjusting tools.

The invention is otherwise not limited to the embodiment described in the foregoing, but also relates to those embodiments of a coupling, in which the transmission of torque or power in both directions is effected by means of resilient elements arranged in said coupling.

What is claimed is:

1. A flexible coupling assembly comprising first and second members, one being a driving member and the other being a driven member, said first member having a first, outer circumferential circular surface, said second member including a coupling part thereof which has a second, inner circular circumferential surface adjacent and radially outward of said first surface, each of said surfaces including a plurality of spaced-apart generally hemispherical cavities, said cavities in one of said surfaces being adjacent and corresponding to the cavities in the other surfaces and together defining a plurality of generally spherical pockets, a plurality of deformable, resilient spherical rolling elements each having a diameter corresponding to said pockets, each one of said elements situated in each of said pockets, said pockets defining in radial cross-section view centrally through said pockets, circles of diameter D, and in axial cross-sectional view, ovals of dimension D in radial direction and a dimension greater than D in the axial direction, said coupling part being a first ring comprising separable segments which are removable from said second member in a generally radial direction, independent of and without disassembling said first and second members, said rolling elements being similarly movable after said segments are removed, first means for detachably securing said segments to form said first ring, and second means for urging said first ring axially for pre-loading said rolling elements in said pockets.

2. A coupling according to claim 1 for connecting two shafts, wherein said two members are tubular, each having a bore for receiving one of said shafts.

3. A flexible coupling assembly comprising first and second members, one being a driving member and the other being a driven member, said first member having a first, outer circumferential circular surface, said second member including a coupling part thereof which has a second, inner circular circumferential surface adjacent and radially outward of said first surface, each of said surfaces including a plurality of spaced-apart generally hemispherical cavities, said cavities in one of said surfaces being adjacent and corresponding to the cavities in the other surface and together defining a plurality of generally spherical pockets, a plurality of deformable, resilient spherical rolling elements each having a diameter corresponding to said pockets, each of said elements situated in each of said pockets, said coupling part being a first ring comprising separable segments which form said second member in a generally radial direction independently of and without disassembling said first and second members, said rolling element being similarly removable after said segments are removed, and first means for detachably securing said segments to form said first ring.

4. A flexible coupling comprising a first member having a first outer circumferential circular surface, a second member including a coupling part thereof which has a second inner circular circumferential surface adjacent and radially outward of said first surface, each of said surfaces including a plurality of spaced-apart generally hemispherical cavities, said cavities in one of said surfaces being adjacent and corresponding to the cavities in the other surface and together defining a plurality of generally spherical pockets, a plurality of deformable, resilient spherical rolling elements each having a diameter corresponding to said pockets, each one of said elements situated in each of said pockets, and comprising an outer layer of a resilient first material, and a reinforced core of a second less resilient material, said pockets defining in radial cross-section view centrally through said pockets circles, of diameter D, and in axial cross-sectional view ovals, of dimension D in radial direction and a dimension greater than D in the axial direction, said coupling part being a first ring comprising separable segments which are removable in a generally radial direction, first means for securing said segments to form said first ring, and second means for urging said first ring axially for pre-loading said rolling elements in said pockets.

5. A flexible coupling comprising a first member having a first outer circumferential circular surface, a second member including a coupling part thereof which has a second inner circular circumferential surface adjacent and radially outward of said first surface, each of said surfaces including a plurality of spaced-apart generally hemispherical cavities, said cavities in one of said surfaces being adjacent and corresponding to the cavities in the other surface and together defining a plurality of generally spherical pockets, a plurality of deformable, resilient spherical rolling elements each having a diameter corresponding to said pockets, each one of said elements situated in each of said pockets, said pockets defining in radial cross-section view centrally through said pockets circles, of diameter D, and in axial cross-sectional view ovals, of dimension D in radial direction and a dimension greater than D in the axial direction, said coupling part being a first ring comprising separable segments which are removable in a generally radial direction, and a second ring which together with the first ring provide said inner surface, with each of said cavities therein defined in part by the first ring and in part by the second ring, first means for securing said segments to form said first ring, and second means for urging said first ring axially for pre-loading said rolling elements in said pockets.

6. A coupling according to claim 5 wherein the first ring defines a greater portion of said cavities than the second ring.

7. A coupling according to claim 5 wherein said second member has an end surface, and said second ring is situated adjacent said end surface with an exposed side, and said first ring is situated adjacent said exposed side.

8. A coupling according to claim 7 wherein said second means comprises screw means extending axially through said rings and into said end surface.

* * * * *

UNITED STATES PATENT AND TRADEMARK OFFICE
CERTIFICATE OF CORRECTION

PATENT NO. : 3,977,212
DATED : August 31, 1976
INVENTOR(S) : Carl-Eric Johansson It is certified that error appears in the above-identified patent and that said Letters Patent are hereby corrected as shown below:

The filing date of the patent application should read -- May 13, 1974 --, not "May 18, 1974" as shown.

Signed and Sealed this

Twenty-first Day of December 1976

[SEAL]

Attest:

RUTH C. MASON
*Attesting Officer*

C. MARSHALL DANN
*Commissioner of Patents and Trademarks*